Figure 1:
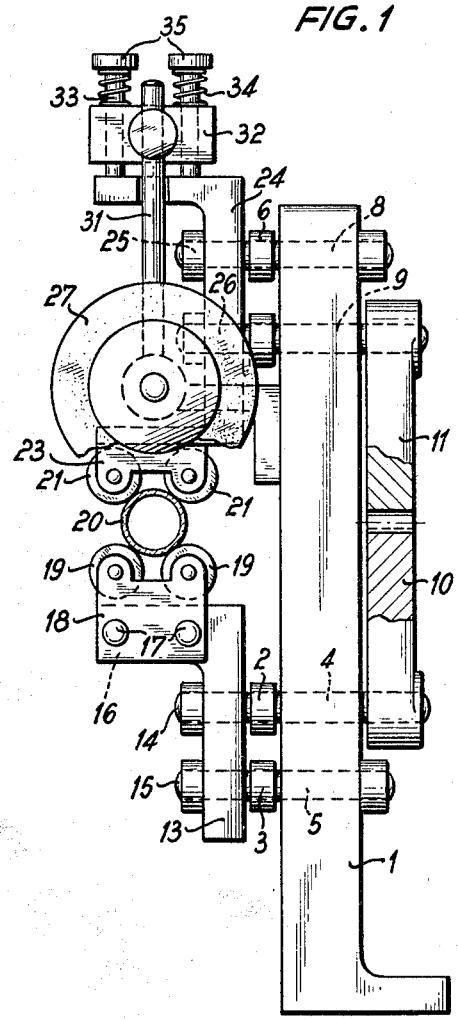

Oct. 18, 1966    G. RÜGER    3,279,129
APPARATUS FOR CLAMPING CYLINDRICAL WORKPIECES INTO A WORKING MACHINE
Filed Oct. 16, 1964    3 Sheets-Sheet 1

INVENTOR
G. Rüger
BY
Richards y Geier
ATTORNEYS

Oct. 18, 1966    G. RÜGER    3,279,129
APPARATUS FOR CLAMPING CYLINDRICAL WORKPIECES
INTO A WORKING MACHINE
Filed Oct. 16, 1964    3 Sheets-Sheet 3

INVENTOR
G. Rüger
by
Richards & Geier
ATTORNEYS

United States Patent Office 3,279,129
Patented Oct. 18, 1966

3,279,129
APPARATUS FOR CLAMPING CYLINDRICAL WORKPIECES INTO A WORKING MACHINE
Günter Rüger, 19 Schneckenbergstrasse, Holzminden, Germany
Filed Oct. 16, 1964, Ser. No. 404,458
Claims priority, application Germany, Oct. 17, 1963, R 36,406
1 Claim. (Cl. 51—237)

The present invention relates to an apparatus for clamping cylindrical work pieces into a working machine, and more particularly to an apparatus for clamping glass pipes which are shaped in the machine or processed therein in some other manner.

In customary apparatuses of this type the work piece is pivotally clamped between two lower and two upper pairs of rolls arranged symmetrically to each other. The lower pairs of rolls are stationary, and the upper pairs of rolls, which guide the work piece, are supported on a swinging arm which is under the impact of springs. This apparatus does not, however, provide for sufficiently reliable central clamping of work pieces of larger tolerance or which are not of circular or oval shape.

The invention has for its primary object to provide an apparatus enabling fast and precisely central clamping of the cylindrical work pieces into the machine, irrespective of their diameter or any tolerances with which they may be provided, and at the same time ensuring a precise alinement of the axial center line of the work piece to the working implement.

Another object of the invention is to provide an apparatus enabling the clamping of very long work pieces.

Still another object is to provide an apparatus by means of which the work piece can be clamped into the working machine which is suited for any type of processing work pieces.

The invention is based upon an apparatus comprising pairs of rolls which are arranged above one another and side by side to one another and which pivotally clamp the work piece between them. According to the invention, the pairs of rolls are arranged on an element connecting two pairs of parallel levers, and of these the two internal levers, which face the work piece, are coupled with each other by transmitting links, which gear with one another. One of these levers is in connection with an operating member by means of which all the pairs of rolls are movable at the same time in order to clamp the work piece in a central position. The operating member is actuated by a pedal lever, by cams or by similar devices, and thus causes the work piece without any delay to be put into the processing position in which it is centered against the working implement. The axial center line of the work piece will always be in precise agreement with the working implement, including those work pieces which have varying cross-sectional shapes, such as not circular or oval ones, or larger tolerances.

Another characteristic feature of the invention it to have the work piece when clamped into the machine, supported by a three-point bearing consisting of two lower pairs of rolls and one upper pair of rolls.

Still another feature of the invention resides in that the two pairs of levers are pivoted in the frame of the apparatus on a joint vertical plane which is laterally displaced against the axial center line of the work piece. Since the levers on which the pairs of rolls are carried are situated beyond the sphere of the work piece, this construction enables clamping of very long work pieces.

The lower pairs of rolls on which the work piece is carried are adjustably supported by a bolt which is fastened to the connection element by which the two lever arms of a pair of levers are held together. This enables adjustment of both lower pairs of rolls to the respective length of the work piece. The work piece will be held by the two lower pairs of rolls in a precisely horizontal position and will receive an additional guidance by the upper pair of rolls.

Further, the interior levers of both pairs of levers which face the work piece are coupled with one another by tooth segments gearing with one another and thus ensuring uniform movement of the two pairs of levers towards or against each other. This provides for uniform movement of the pairs of rolls carried on the pairs of levers.

In an advantageous embodiment of the invention, a friction wheel is pivotally arranged in the connection element of the upper pair of levers. The friction wheel is under spring force and puts the work piece into rotation during the working procedure. The shaft of the friction wheel is flexible and coupled with its drive movably in axial direction. Because of its position in the upper connecting element the friction wheel is moved simultaneously with the clamping of the pairs of rolls against the work piece and thus enables further savings in time for clamping the work piece into the machine.

Figure 2:
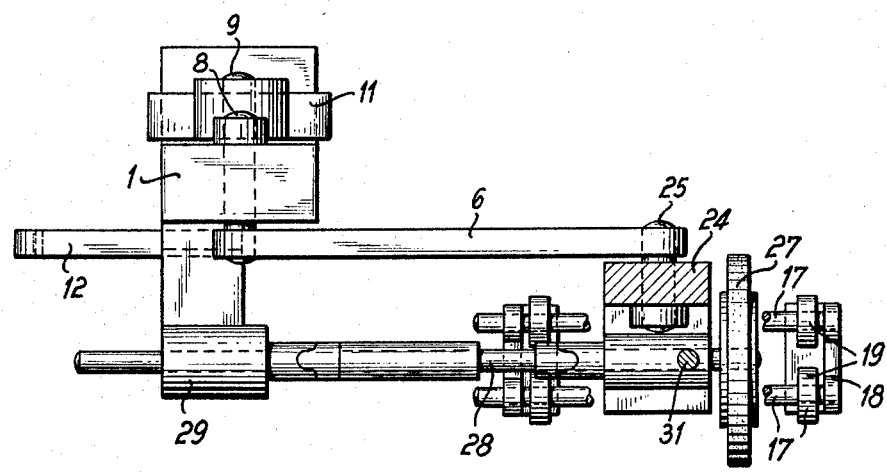
Figure 3:
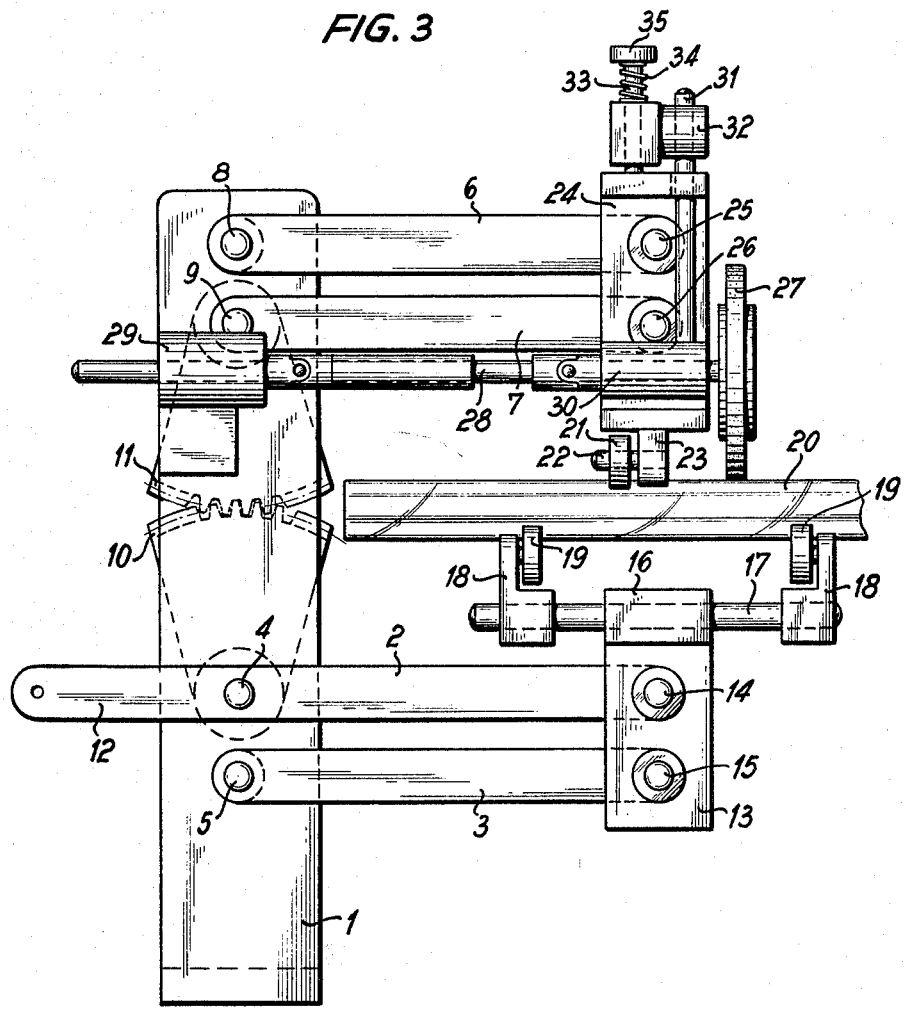

Further advantages and characteristics of the invention will become apparent from the following more detailed description of an example of an embodiment of the invention, which is made with reference to the accompanying drawings, in which:

FIG. 1 is the front view of an apparatus
FIG. 2 is the top view and
FIG. 3 is the side-view from the left.

The apparatus is designed, for example, for a machine which produces standard grindings on glass pipes and comprises a frame 1, in the lower part of which two parallel levers 2, 3 are disposed swingably by means of horizontal pins 4, 5. In the upper part of frame 1 two parallel levers 6, 7 are arranged symmetrically to levers 2, 3 on horizontal pins 8, 9. The axial centers of pins 4, 5 and 8, 9 are in a common vertical plane. A tooth segment 10 and 11 respectively is secured on that end of pins 4 and 9 which is turned away from levers 2 and 7. Both tooth segments 10 and 11 gear with each other, whereby levers 2, 7 are necessarily coupled with each other. Lever 2 via its axial pin 4 has an extension 12 to which an operation member, for example, a lever rod being actuated by foot, is fixed.

The outer ends of both lower levers 2, 3 are joined with each other by a connecting element 13, in which horizontal pins 14, 15 are pivotally arranged which are secured to both ends of the levers. These pins 14, 15 are parallel pins 4, 5 disposed in frame 1. The upper end of connecting element 13 carries a horizontal supporting-plate 16, in which two parallel horizontal rods 17 are fixed. On the ends of both rods 17 surpassing supporting-plate 16 a bearing casing 18 is adjustably located. In each bearing casing 18 two rolls 19 are pivotally arranged side by side. On both pairs of rolls 19 lies the work piece to be machined, for example, a glass pipe 20, as shown in FIGURES 1 and 3. The glass pipe 20 is held in its position at the top by another pair of rolls 21, which is situated on two rods 22 arranged in the same vertical plane as the two lower rods 17. Both rods 22 are carried by the lower extension 23 of a connecting element 24, which is arranged symmetrically to the lower connecting element 13 and in the same vertical plane as the latter and which receives the horizontal pins 25 and 26 of the ends of both upper levers 6, 7 incorresponding sockets.

By connecting elements 13 and 24 the lower levers 2, 3 and upper levers 6, 7 respectively are joined like a flexible parallelogram in such manner, that when moving operation lever 12 upwards or downwards both pairs of levers 2, 3, and 6, 7 respectively are necessarily swung like a mirror image to each other via tooth segments 10, 11, whereby their connecting elements 13 and 24 are led parallel in a vertical plane to and against one another. For clamping the glass pipe 20 placed on both lower pairs of rolls 19 operation lever 12 is swung downwards, whereby both lower pairs of rolls 19 as well as the upper pair of rolls 21 are pressed equally and parallel to each other against glass pipe 20 and are holding same in a three-point support exactly central to the working implement not shown. The clamping as well as the taking off requires only a movement of the operation lever 12, so that these procedures can be carried out in very short time. Glass pipe 20 is then brought in exact equal central position to the implement on clamping the pairs of rolls, even if it is of oval or not circular cross section or if the following glass pipes to be worked show greater tolerances in their diameter. The glass pipes may have any length, as the pairs of levers 2, 3 and 6, 7 are in a vertical plane and laterally displaced against the center line of glass pipe 20 and therefore do not reach to the glass pipe.

If during the working procedure the glass pipes are to be put into rotation in their position on the pairs of rolls, e.g. to form standard grindings, spherical grindings, bushings of cocks etc., a friction wheel 27 is provided which abuts the glass pipe 20 beside the upper pair of rolls 21. Friction wheel 27 is arranged on the end of a shaft 28 with universal joints. Shaft 28 is supported by a lateral projection 29 of frame 1 and carries at its ends a driving disc not shown in the drawings. In the vicinity of friction wheel 27 shaft 28 is enclosed in a casing 30, which casing is slidably secured to the upper connecting element 24. A vertical rod 31, the upper end of which is adjustable in its height and engages a block 32, is connected with casing 30. The block is shiftable on two parallel bolts 33 being fixed at the upper side of connecting element 24 and is under pressure of screw-springs 34 arranged on both bolts 33, said screw-springs having their abutment upon the enlarged head 35 of both bolts 33. Screw-springs 34 are pressing friction wheel 27 against glass pipe 20, which by the rotating friction wheel 27 is put into rotation. Because of the position of the friction wheel 27 at the connecting element 24 of the upper pair of levers 6, 7 it is assured that it will abut upon glass pipe 20 when clamping the pairs of rolls 19, 21 and that it is also simultaneously lifted from glass pipe 20 at the separation of both pairs of rolls, so that clamping and releasing of the glass pipe is not prevented by friction wheel 27. Because of its elastic support friction wheel 27 surely abuts even with glass pipes of different diameters.

It is to be understood from the foregoing description of my invention that the arrangement and construction of parts shown and described has been made by way of example and therefore is not meant to be construed in a limiting sense, and I reserve the right to make certain changes in construction and arrangement of parts of the apparatus which are intended to be within the scope of my claim which is:

I claim:

An apparatus for clamping cylindrical workpieces into a working machine, in combination, a plurality of pairs of rolls disposed in the frame of said apparatus, two pairs of said rolls being located below and one pair above said workpiece, two pairs of levers arranged parallel of each other and above one another, connecting elements for said levers, a friction wheel pivotally arranged in the connecting element of the upper pair of said levers, elastic means connected to said friction wheel and pressing said friction wheel to the workpiece, and a drive coupled with the shaft of said friction wheel, said shaft being flexible and supported by said frame.

References Cited by the Examiner

UNITED STATES PATENTS

| 1,954,920 | 4/1934 | Damerell | 279—119 |
| 2,732,216 | 1/1956 | Sloan et al. | 279—118 |
| 2,823,408 | 2/1958 | Meadors | 51—236 |
| 3,047,989 | 8/1962 | Sloan | 51—236 |

FOREIGN PATENTS

| 551,132 | 5/1932 | Germany. |
| 257,803 | 4/1949 | Switzerland. |

HAROLD D. WHITEHEAD, *Primary Examiner.*